United States Patent [19]

Edwards et al.

[11] 4,329,694

[45] May 11, 1982

[54] AC CORONA TO REMOVE BACKGROUND FROM THE TRANSFER MEMBER OF A THERMOMAGNETIC COPIER

[75] Inventors: Donald W. Edwards; Emery J. Gorondy, both of Wilmington, Del.; Arend Van Roggen, Kennett Square, Pa.

[73] Assignee: E. I. Du Pont de Nemours and Company, Wilmington, Del.

[21] Appl. No.: 87,077

[22] Filed: Oct. 22, 1979

Related U.S. Application Data

[60] Division of Ser. No. 771,381, Mar. 18, 1977, which is a continuation-in-part of Ser. No. 672,558, Mar. 31, 1976.

[51] Int. Cl.[3] .................... G11B 9/00

[52] U.S. Cl. .................... 346/74.3; 361/214; 427/145

[58] Field of Search .................... 346/74.1; 361/212, 214; 427/145; 118/623, 638, 639

[56] References Cited

U.S. PATENT DOCUMENTS

| | | | |
|---|---|---|---|
| 2,778,635 | 1/1957 | Eash | 361/222 |
| 2,857,290 | 10/1958 | Bolton | 346/74.1 |
| 2,996,400 | 8/1961 | Rudd et al. | 118/638 |
| 3,043,685 | 7/1962 | Rosenthal | 346/74.1 |
| 3,250,636 | 5/1966 | Wilferth | 427/47 |
| 3,526,191 | 9/1970 | Silverberg et al. | 346/74.1 |
| 3,530,794 | 9/1970 | Ritzerfeld | 346/74.1 |
| 3,615,813 | 10/1971 | Clarke et al. | 361/212 |
| 3,645,770 | 2/1972 | Flint | 427/47 |
| 3,740,265 | 6/1973 | Springer | 118/639 |
| 3,816,799 | 6/1974 | Ott et al. | 361/212 |
| 3,945,343 | 3/1976 | Berkowitz | 427/48 |
| 4,032,923 | 6/1977 | Pond et al. | 346/74.1 |
| 4,101,904 | 7/1978 | Weigl et al. | 346/74.1 |
| 4,110,758 | 8/1978 | Nelson et al. | 346/74.1 |
| 4,146,898 | 3/1979 | Nelson | 346/74.1 |

*Primary Examiner*—Glen R. Swann, III

[57] ABSTRACT

A process for reproducing graphic information wherein a magnetic image is formed in a premagnetized layer of acicular chromium dioxide by heating the chromium dioxide selectively to above its Curie point. Ferromagnetic toner particles are then applied uniformly to the chromium dioxide layer, so as to adhere only in the magnetized areas. The toner particles are electrostatically transferred to a substrate and fused into position. Alternating current coronas or other static neutralizing devices are used to neutralize unwanted charges on toner particles which would otherwise cause fuzzy images and unwanted background markings on the final copies.

7 Claims, 9 Drawing Figures

AC CORONA TO REMOVE BACKGROUND FROM THE TRANSFER MEMBER OF A THERMOMAGNETIC COPIER

CROSS-REFERENCE TO RELATED APPLICATIONS

This is a division of application Ser. No. 771,381, filed Mar. 18, 1977, which in turn is a continuation-in-part of Ser. No. 672,558, filed Mar. 31, 1976.

BACKGROUND OF THE INVENTION

1. Field of the Invention

The present invention relates to a process for dry printing of information. The process involves forming a magnetic image on a master followed by decorating the magnetic image with ferromagnetic toner particles which are then electrostatically transferred to a dielectric substrate and fixed in place.

2. Description of the Prior Art

Both Xerography and magnetography are known. Xerography involves: forming an electrostatic charge on a photoconductive material such as selenium; imagewise exposing the photoconductive material to light whereby the exposed areas lose their charge; and applying a pigmented, finely divided, electrically charged powder which is attracted to and held on the electrostatic image. The charged toner image is then transferred to copy paper either with an opposite electrostatic charge or by means of pressure.

In magnetography a magnetic image is formed, and ferromagnetic particles applied thereto which adhere to the magnetized areas of the image. The particles are then transferred to copy paper either by pressure or magnetically. The pressure technique causes objectionable wear to the imaging member and can also cause buildup of a film on the imaging member which causes smudging.

In magnetic transfer it has been found difficult to effect transfer of toner without erasing the latent magnetic image on the imaging member.

SUMMARY OF THE INVENTION

The present invention relates to forming a latent magnetic image, decorating the latent magnetic image with an uncharged ferromagnetic toner, and then transferring the toner to a substrate electrostatically whereby the problems of pressure or magnetic transfer are overcome and using static neutralizing devices such as alternating current coronas to neutralize electrostatic charges on those toner particles which would otherwise cause fuzzy images on the final copies and unwanted background markings.

By uncharged toner we mean toner which has not purposely been charged by means such as corona or triboelectric means but which may contain small triboelectric charges of either polarity.

DESCRIPTION OF THE DRAWING

FIGS. 3–7 show the stepwise formation of the latent magnetic image, the decoration thereof with toner, the transfer of the toner to the copy paper, and the fusion of the toner to the copy paper.

DESCRIPTION OF THE PREFERRED EMBODIMENT

Figure 3:
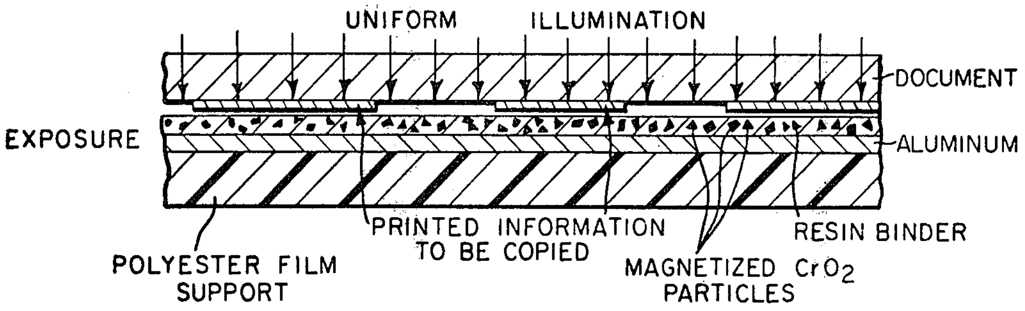
FIG. 3 is a diagram of the exposure of the magnetic master by radiant energy.
Figure 4:
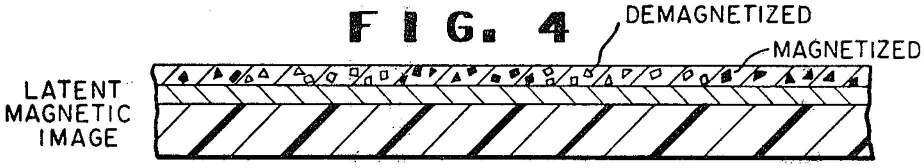
FIG. 4 is a diagram of the latent magnetic image.
Figure 5:
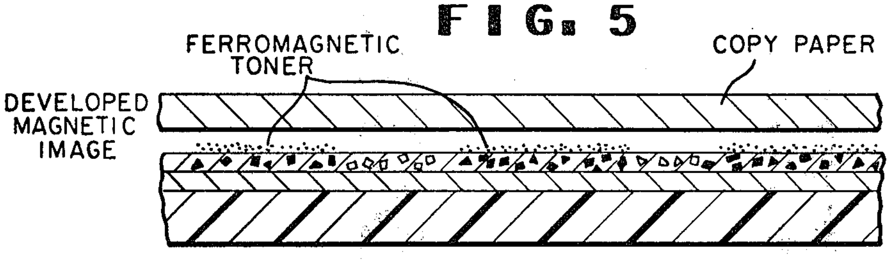
FIG. 5 is a diagram of the toned magnetic image superposed adjacent the copy paper.
Figure 6:
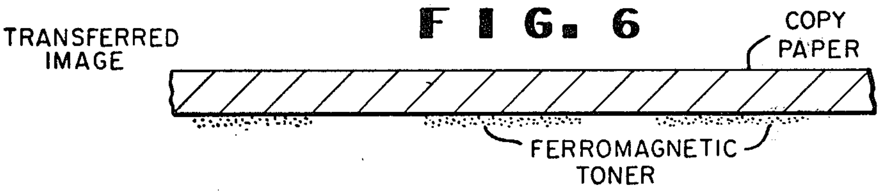
FIG. 6 is a diagram of the copy paper decorated with the transfer image.
Figure 7:
FIG. 7 is a diagram of the final copy decorated with the fused image.

An aluminized polyester film having a layer of spatially periodic magnetized chromium dioxide particles in a binder adhered to the surface thereof which is to be used as a copying device is exposed to uniform illumination as shown in FIG. 3. As can be seen from FIG. 3 the printing on the translucent document prevents the illumination from reaching the magnetized chromium dioxide particles, thus, leaving them magnetized in the areas under the printing. On the other hand, those areas of the document being copied which contain no printing do not prevent the illumination from reaching the magnetized chromium dioxide particles, thus heating them to above their Curie point of about 116° C., thus demagnetizing them. In this way the latent magnetic image shown in FIG. 4 is prepared. Ferromagnetic toner particles are applied to the latent magnetic image to form a developed magnetic image and copy paper is brought into superposition therewith as shown in FIG. 5. A corona discharge device then electrostatically charges the back of the paper. An electrostatic force sufficient to overcome the magnetic attraction between the previously uncharged toner particles and the latent magnetic image is generated causing the toner particles to transfer to the copy paper and be adhered thereto with surprisingly high efficiency as shown in FIG. 6. This electrostatic transfer has no effect on the latent magnetic image which may be reused many times. Reference is made to U.S. Pat. No. 4,233,382 to Edwards et al. The transferred toner particles are then fused to the copy paper as shown in FIG. 7 by heat.

The toner particles preferably are magnetic pigments encapsulated in a suitable thermoplastic binder. Generally the toner particles have an average size ranging from 10 to 30 microns with a preferred average size ranging from 15 to 20 microns. Spherical particles such as prepared by spray drying are preferred because of their superior flow properties which can be enhanced by the addition of minute amounts of a flow additive such as fumed silica. A further description of the preparation of toner particles may be found in U.S. Pat. No. 3,627,682. When using the apparatus disclosed herein the toner particles used herein should have a low electrical conductivity so that they will transfer readily. If the particles have high conductivity, they will be passed back and forth between the drum and the paper causing a diffuse image and low transfer efficiency. Generally the toner powder electrical conductivity is below $1\times10^{-13}$ mho/cm.

Figure 1:
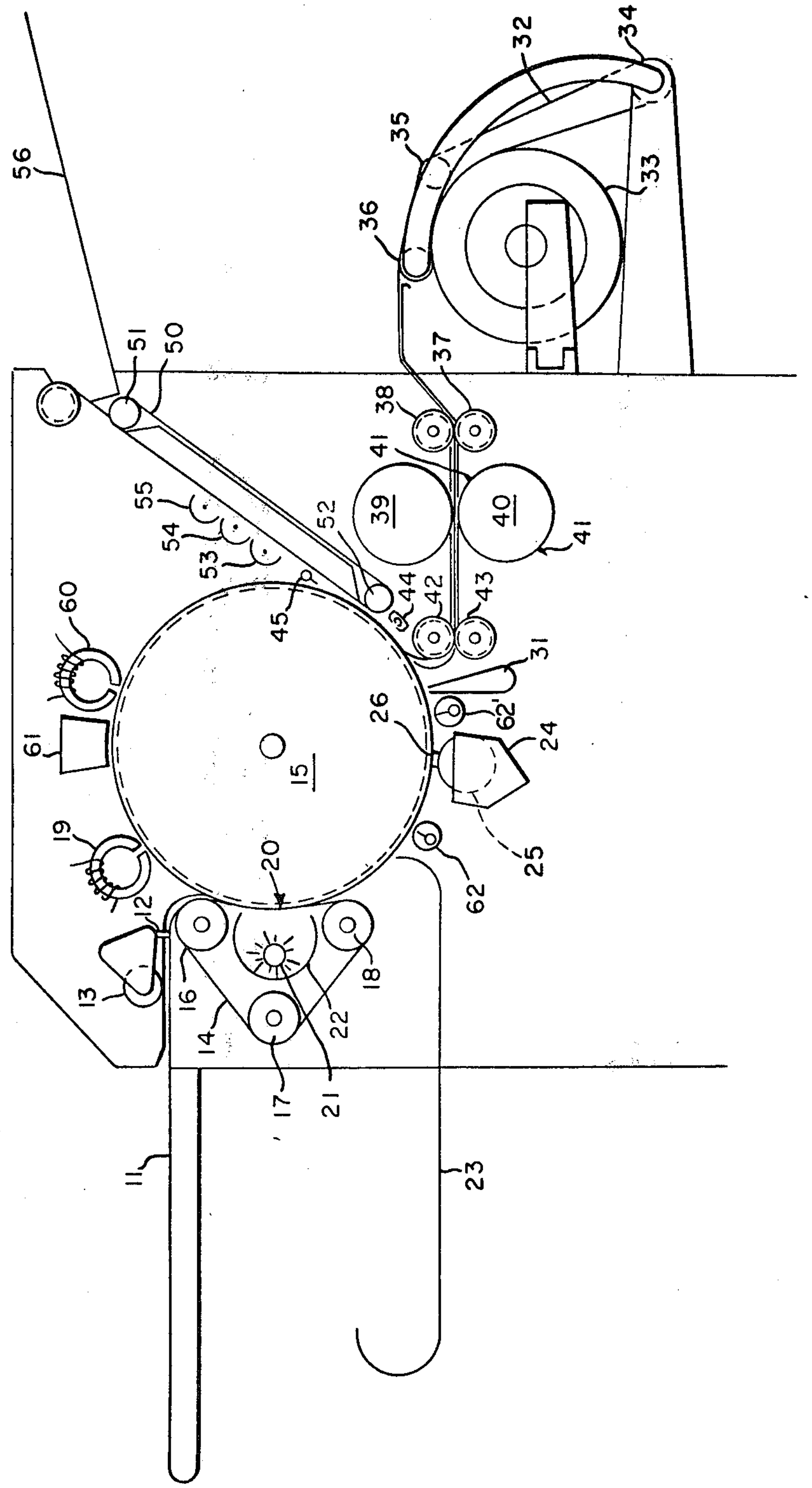
FIG. 1 is a schematic side view of a printer used to perform the process of the present invention.

Referring to FIG. 1, the document which is to be copied is placed on shelf 11 and urged against gate 12. The copier is then activated to lift gate 12 and lower feed roll 13 into contact with the document. Feed roll 13 feeds the document into the nip between endless belt 14 and drum 15. Endless belt 14 is made of a transparent film such as poly(ethylene terephthalate) about 2–7 mils (0.05–0.18 mm) in thickness. Rollers 16, 17 and 18 serve to drive and guide endless belt 14. The surface of drum 15 is preferably a poly(ethylene terephthalate) film about 5 mils (0.13 mm) in thickness. The convex surface of this film is coated with a conductive layer such as by being aluminized with a layer of aluminum to a surface resistivity of 1 to 1,000 ohms. The aluminum layer preferably is grounded. The conductive support may also be a plastic such as polyoxymethylene sleeve coated or formulated with aluminum, nickel, copper or other conductive material. The support may also be the conductive metal itself. The surface of the aluminum is coated with a layer of ferromagnetic material such as acicular chromium dioxide in an alkyd or other suitable binder. Generally, the acicular chromium dioxide layer is from 0.001 to 0.012 mm in thickness and contains from 40 to 85 weight percent acicular chromium dioxide and from 15 to 60 weight percent alkyd or other suitable resin binder. Suitable acicular chromium dioxide can be prepared in accordance with the teachings of U.S. Pat. No. 2,956,955, issued Oct. 18, 1960, to Paul Arthur, Jr. However, the preferred acicular chromium dioxide particles are produced by techniques disclosed in U.S. Pat. Nos. 2,923,683 and 3,512,930.

Drum 15 rotates in a counterclockwise direction. The ferromagnetic coating on the drum is magnetized by premagnetizer 19, which records a periodic pattern. A number of techniques are known for doing this magnetic structuring. We find 300 to 1000 magnetic reversals per inch (12 to 40 per mm) on the magnetizable surface to be a working range and prefer about 400–600 magnetic reversals per inch (15 to 24 per mm).

Alternatively, a film structured by grooves containing acicular chromium dioxide can be used for the surface of drum 15 in which case a simple DC magnet can be used as premagnetizer 19. Generally from 200 to 300 grooves per inch (7.5 to 12 per mm) across the drum will be used giving 400 to 600 magnetic reversals per inch (15–24 per mm).

The magnetized drum surface in contact with the document is then moved past an exposure station indicated generally at 20. The exposure station consists of lamp 21 and reflector 22. A suitable lamp 21 is a xenon flash, which has a color temperature equivalent to 6000° C. The surface of drum 15 is exposed stepwise until the entire document has been recorded as a latent magnetic image on the surface of drum 15. The chromium dioxide as used herein has a Curie temperature of about 116° C. The marking of the document being copied, pencil lines, printing or the like, shade the areas of the chromium dioxide over which such markings are situated during exposure thereby preventing these areas reaching the Curie point. Thus, after exposure, the surface of the drum will have magnetized areas of chromium dioxide corresponding to the marked areas of the translucent document being copied.

After exposure, the document being copied is dropped into tray 23.

The imagewise magnetized drum 15 is rotated past a toner decorator. The toner decorator comprises a trough 24 fitted with rapidly rotating roll 25 and bar 26. Static eliminator 62' removes any charges on toner particles that emerge from the toner decorator. A vacuum knife 31 is used to remove whatever toner particles may have adventitiously become attached to the demagnetized areas of the chromium dioxide on the surface of drum 15.

The paper 32 on which the copy is to be made is fed from roll 33 around idler rolls 34, 35, 36 to feed rolls 37 and 38. Backing roll 39 cooperates with roll 40 equipped with cutting edges 41. Rolls 39 and 40 are activated by means not shown to cut the paper 32 to the same length as the length of the document being copied. The paper is then fed by feed rolls 42 and 43 into physical contact with the surface of drum 15. The paper 32 in contact with the surface of drum 15 is fed past corona discharge device 44. Corona discharge device 44 preferably is of the type known as a Corotron which comprises a corona wire spaced about 11/16" (17.5 mm) from the paper and a metal shield around about 75 percent of the corona wire leaving an opening of about 90° around the corona wire exposed facing the paper 32. The metal shield is insulated from the corona wire. The metal shield is maintained at ground potential. Generally the corona wire will be from 0.025 to 0.25 mm. in diameter and will be maintained at from 3000 to 10000 volts. The corona wire may be at either a negative or a positive potential with negative potential being preferred. The Corotron 44 electrostatically charges the back side of paper 32. This lightly pins the paper to the drum, and upon separation of the paper from the drum has caused image-wise transfer of toner particles to paper 32. At the region in which paper 32 separates from the surface of drum 15 under the action of endless vacuum belt 50, the toner particles remain held in image-wise fashion to paper 32. We have observed that Corotron 44 should be disposed over the arc of intimate contact for best results. If Corotron 44 is not so located or if there are forces present preventing the paper 32 from forming an arc of intimate contact, the resultant image becomes fuzzy. There is only a light amount of pressure between paper 32 and the surface of drum 15 (i.e., merely enough to hold them adjacent each other). The pressure between paper 32 and drum 15 is essentially entirely generated by the electrostatic attraction generated by corona discharge device or Corotron 44. Nevertheless transfer efficiency is surprisingly high and approaches 100% for toners with nontacky surface characteristics and low conductivity. The paper 32 is then removed from the surface of drum 15 by the action of the vacuum belt 50 in conjunction with the action of puffer 45 that forces the leading edge onto the surface of endless vacuum belt 50 driven by rollers 51 and 52. Endless vacuum belt 50 transports paper 32 past infrared lamps 53, 54, 55 which heat the thermoplastic resin encapsulating the ferromagnetic material in the toner particles causing them to melt and fuse to the paper 32. The decorated paper 32 is then fed into hopper 56.

When multiple copies of the same document are to be made, a control means, not shown, is so actuated that drum 15 is continuously rotated without activating demagnetizer 60, vacuum box 61, magnetizer 19 or lamp 21 because the electrostatic transfer of the toner particles does not affect the magnetic state in the chromium dioxide layer on the surface of drum 15. Many copies can be printed from a single exposure at speeds of up to 300 feet/minute. Over 10,000 copies from a single image have been demonstrated.

Toner particles which do not transfer may themselves become electrostatically charged in the transfer zone adjacent to the Corotron 44. These charges do not bleed to ground because of the nature of the toner. Subsequently, these particles will pick up other particles electrostatically in decorator 24 and ultimately transfer these to produce unwanted markings. To prevent this, a static eliminator 62 is used. In accordance with the present invention this is an alternating current discharge bar, but may be any static neutralizing device known such as nuclear bars. It has been found that a 60 Hz, 7000 volt Simco unit is satisfactory for this purpose.

A percentage of toner particles that do not transfer are in image areas. Particles in image areas still charged upon passing image decorator 24, pick up toner particles electrostatically which are so tightly held that vacuum knife 31 cannot remove them causing the image to "bloom" or grow larger with a fuzzy outline upon repeated copying. Static eliminator 62 completely prevents this unwanted phenomenon. There are also some toner particles sparsely distributed over nonimage areas which do not transfer to the paper and which become electrostatically charged in the transfer zone. They also attract toner electrostatically in the decorator 24 which cannot be subsequently removed entirely by the vacuum knife 31 resulting in unwanted background on the final copies. Static eliminator 62 also prevents this unwanted phenomenon.

The action of decorator 24 causes a number of toner particles to become tribo-charged by contacts with each other and the various surfaces. Such electrostatically charged particles become bound to the surface of drum 15 by so-called "mirror" images. The nature of the toner does not hence allow the charge to bleed off to the grounded surface as do any tribo-charge directly on the surface of drum 15. If permitted to remain on the surface of drum 15 these particles, randomly distributed, would affect the cleanliness of the background of the final (transferred) image on the copy paper. Vacuum knife 31 is highly effective in removing these particles but some of these particles, probably more highly charged or physically smaller than others, are sufficiently held to the surface of drum 15 to not be removed by vacuum knife 31. A second static eliminator 62' is provided after image decorator 24 and before vacuum knife 31 to remove the electrostatic charge on such particles thus enhancing the action of vacuum knife 31. Static eliminator 62 is required for repetitive, stable reproduction of the latent magnetic image. Eliminator 62' is required to produce background areas of superior cleanliness. In combination, the two eliminators cooperate to produce magnetographic copies of superior quality and permit copying in high multiples from a single latent magnetic image.

When it is desired to prepare copies from a different document, demagnetizer 60, which conveniently can be a DC magnetic head in the case of continuously coated film, is activated and the chromium dioxide is uniformly magnetized. Whatever toner particles may be remaining on the previously magnetized areas of chromium dioxide, are removed by vacuum box 61 which preferably acts in conjunction with brushes. The chromium dioxide is then magnetized by magnetizer 19 to provide a periodic magnetic structure and the process described above repeated.

It is to be understood that substrates other than paper, such as cloth and dielectric films, can be used.

Figure 2:
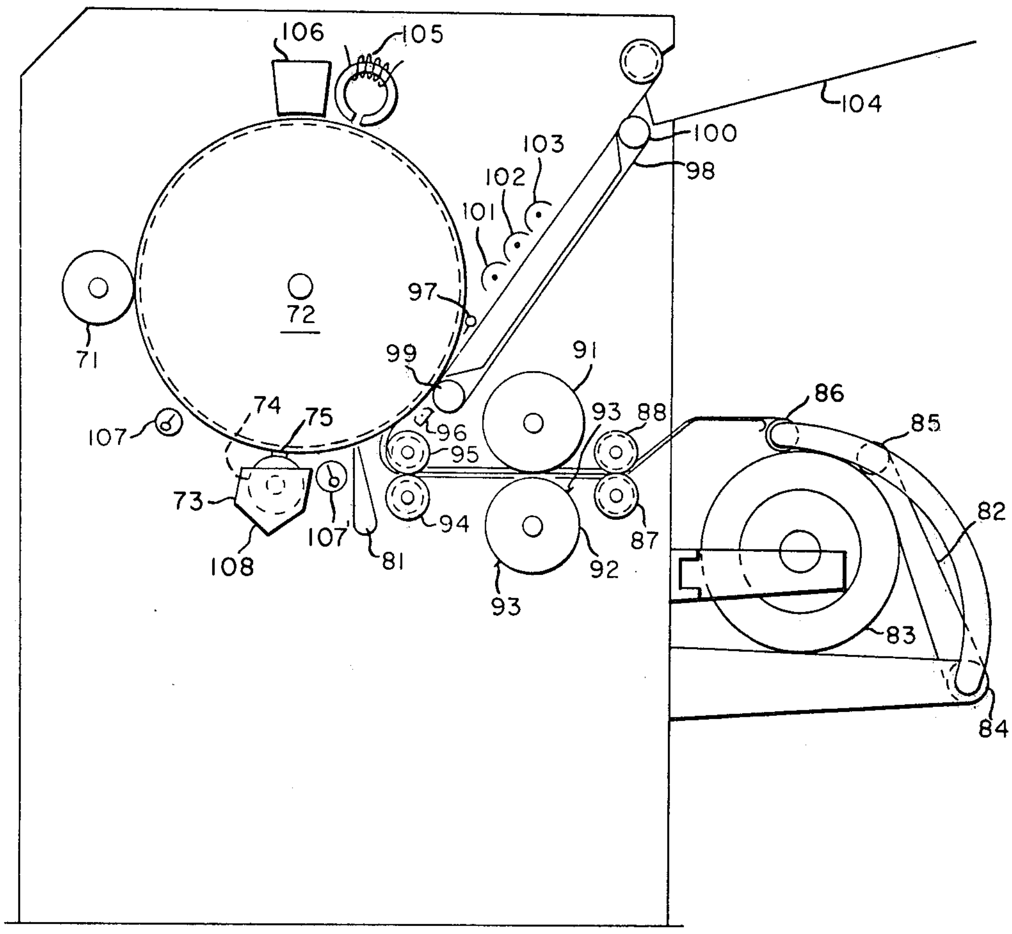
FIG. 2 is a side view of a printer equipped with a magnetic printing head used to perform the process of the present invention.

FIG. 2 shows an alternate form of printer using a magnetic printing head such as have been reviewed by W. H. Meiklejohn in A.I.P. Conference, Proc. (Pt. 2) 10, (1973) pages 1102 to 1114. In the example of FIG. 2 magnetic printing head 71 is used to form the latent image on the magnetic surface of drum 72 which has the same structure as drum 15 described above. Magnetic printing head 71 is a multitrack printing head such as have been developed for fixed heads for track discs. Preferably track density will about about 200 magnets per inch (8 per mm) which is adequate to print with good resolution. Generally the multitrack write head will be activated by head drivers which can be activated by a read-only memory character generator. The read-only memory character generator can respond to an information storage device such as a magnetic tape which may be part of the printer or remote therefrom. Alternatively, a keyboard can activate the multitrack write head, wherein magnetic structuring is accomplished with the magnetic write head. Drum 72 rotates in a counterclockwise direction carrying the latent image past static eliminator 107. Electrostatic charges carried on any particles on the surface of drum 72 are neutralized by eliminator 107. Such charged particles can be adventitiously adhered particles or particles in an image area that did not transfer. Such particles, having passed transfer Corotron 96, can be highly charged and would pick-up oppositely charged toner particles in toner decorator 108 if it were not for the neutralization provided by static eliminator 107. This can be any of the well-known types. Again we prefer a 60 Hz, 7000 volt AC corona discharge. As drum 72 rotates the latent image past toner decorator 108 which comprises a trough 73 fitted with rapidly rotating rolls 74 and stationary bar 75, the latent image is decorated with toner to produce a developed magnetic image. Static eliminator 107' removes any charges on toner particles that emerge from toner decorator 108. Such charges derive from tribo-charging and cause particles to adhere to drum 72. Thus, vacuum knife 81 is able to remove any unwanted toner particle, i.e., not held on an image area.

The paper 82 to which the toner pattern is to be applied is fed from roll 83 around idler rolls 84, 85, and 86 to feed rolls 87 and 88. Backing roll 91 cooperates with roll 92 equipped with cutting edges 93. Rolls 91 and 92 are activated by means not shown to cut the paper 82 to the desired length. The paper is then fed by feed rolls into physical contact with the surface of drum 72. The paper 82 in contact with the surface of drum 72 is fed past corona discharge device or Corotron 96 which causes the toner particles to be electrostatically transferred to paper 82. The paper 82 is then removed from the surface of drum 72 by the action of puffer 97 that forces the leading edge onto the surface of endless vacuum belt 98 driven by rollers 99 and 100. Endless vacuum belt 98 transports paper 82 past infrared lamps 101, 102 and 103 which heat the thermoplastic resin encapsulating the ferromagnetic material in the toner particles causing them to melt and fuse to the paper 82. The decorated paper 82 is then fed into tray 104. The drum can be continuously rotated to make a plurality of copies.

When it is desired to make a different print, demagnetizer 105 is actuated to erase the latent magnetic image and vacuum box 106 is used to remove any toner particles remaining on the old latent magnetic image.

The process can also be operated using either a thermal stylus or an electrical stylus to create the latent magnetic image, the former by conductive heating and the latter by electrical resistance heating of the imaging layer. Either stylus can demagnetize selected areas by heating previously magnetized material above the Curie point or it can magnetize selected areas thermoremanently by allowing the heated imaging material to cool through its Curie point in the presence of a magnetic field. A field of 20 to 200 Oe adjacent to the stylus has been found to be sufficient for thermoremanent magnetization, while a much stronger field of at least 800 Oe is necessary to magnetize unheated chromium dioxide sufficiently. It is recognized, of course, that imaging with electromagnetic or thermal transducers onto a continuous coating with its surface magnetized with a DC magnet will require modulation consistent with establishing magnetic gradients for adequate toner attraction in magnetized image areas.

Figure 8A:
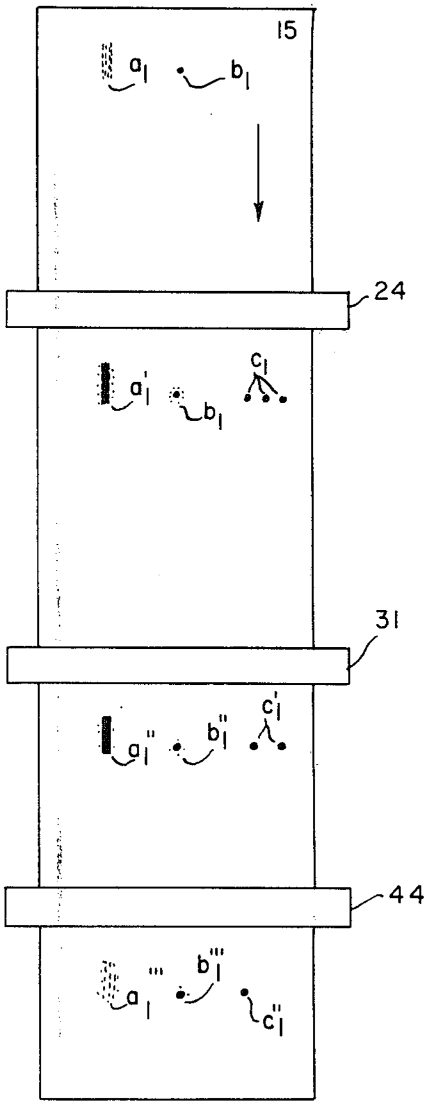
FIG. 8*a* is a schematic view of the developed surface of drum 15 of FIG. 1 showing the result of practicing magnetographic copying without the electrostatic neutralizers of the instant invention.

FIG. 8*a* is a developed view of the surface of drum 15 of FIG. 1 schematically showing employment of image decorator 24, vacuum knife 31, and transfer Corotron 44 without the alternating current coronas (and without functional representations of components not pertinent to explaining the actions of the a-c coronas). At $a_1$ is shown a sparsely decorated indicia, here for illustrative purposes a letter I, that has not entirely transferred in the transfer zone and has become charged electrostatically. The sign of the charge is not material. Alongside $a_1$ is shown an adventitiously adhered particle of toner $b_1$ (schematically enlarged) also similarly charged. After the surface of drum 15 passes image decorator 24 at $a_1'$ is shown the letter I decorated with toner magnetically but also carrying toner adhered electrostatically. At $b_1'$ are seen toner particles electrostatically adhered to the adventitiously attached toner particle so forming a cluster. Moreover, there are some tribo-charged particles randomly adhered to the conductive surface of drum 15, here represented by three such particles $c_1$.

Vacuum knife 31 removes some of the more loosely bound toner particles but some remain at $a_1''$, $b_1''$, and $c_1'$. Note that the I has started to bloom. After passing the transfer zone adjacent Corotron 44 most of the toner particles, wanted and unwanted, have transferred but some remain as shown at $a_1'''$, $b_1'''$, and $c_1''$. The copy made has slightly fuzzy indicia and some dirty background. Note that in the next printing cycle, there are now additional untransferred and charged toner particles at $a_1$ and $b_1$, which will result in even greater blooming of the image and dirtier background due to blooming of background particles. Furthermore, untransferred particles at $c_1$ become a new nucleation point for unwanted background toner. Thus, with each successive printing cycle, copy quality grows progressively poorer.

Figure 8B:
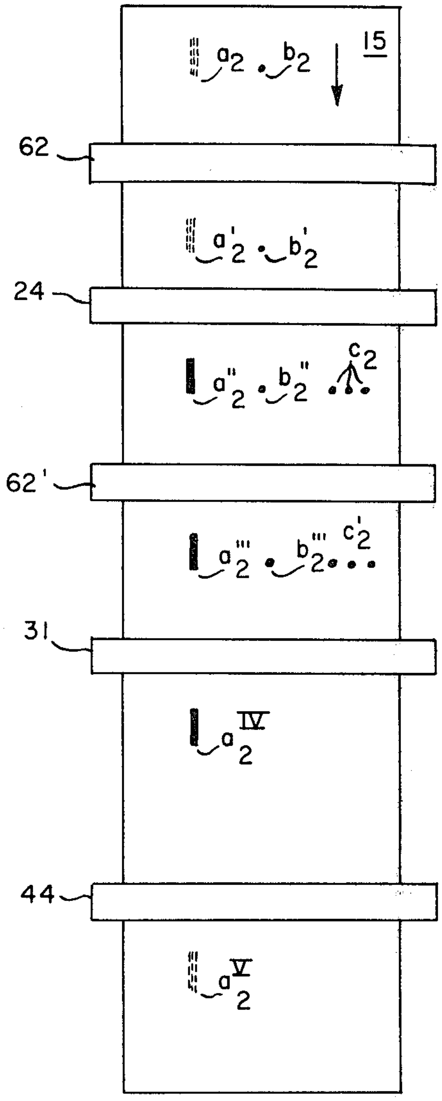
FIG. 8*b* is a schematic view similar to FIG. 8*a* showing the use of the alternating current coronas of the invention.

Now consider FIG. 8*b* showing the use of a-c coronas 62 and 62'. $a_2$ and $b_2$ are charged toner, the former untransferred indicia, the latter adventitious. After passing a-c corona 62, $a_2'$ and $b_2'$ remain but are neutralized electrostatically. Thus, the indicia becomes decorated without blooming as at $a_2''$ and adventitiously adhered particle $b_2''$ does not attract a cluster of toner particles. However, tribo-charged particles may cling to the surface of drum 15 as at $c_2$. After passing a-c corona 62', $a_2'''$ and $b_2'''$ are as before but particles $c_2'$ are neutralized. Thus, on passing vacuum knife 31 nearly all toner particles have been removed from demagnetized non-image areas and only unbloomed decorated indicia $A_2^{VI}$ remains with the result that the toner image transferred to paper adjacent Corotron 44 is crisp with a clean background. Any untransferred toner as at $a_2^{V}$ moreover is within the bounds of the original indicia and subsequent copies will also be crisp and clean.

We claim:

1. An apparatus for applying uncharged ferromagnetic toner particles to selected areas of a substrate comprising a movable layer of electrically grounded selectively magnetized ferromagnetic particles, drive means to advance said layer, means for applying nonconductive ferromagnetic toner particles to said layer, means for removing the nonconductive ferromagnetic toner particles from areas of said layer not selectively magnetized, means to bring a substrate into superposed position against said layer, means for applying an electric field to the substrate while it is superposed against the layer, means for removing said substrate from said layer, and a static neutralizing device adapted to neutralize any charges on any particles left adhering to said layer after said substrate has been removed from superposed position thereagainst.

2. The apparatus of claim 1 wherein the static neutralizing device is an alternating current discharge device.

3. The apparatus of claim 2 wherein a second static neutralizing device adapted to neutralize any charges on the toner particles applied to said layer followed by a vacuum knife is positioned between the means for applying ferromagnetic toner particles to the layer and the means for applying the electric field to the substrate.

4. The apparatus of claim 3 wherein both static neutralizing devices are alternating current discharge devices.

5. The apparatus of claim 3 wherein the means for applying an electric field to the substrate is a means for applying an electric charge to the side of the substrate away from the toner particles.

6. The apparatus of claim 1 wherein magnetic means are provided to selectively magnetize the movable layer of electrically grounded ferromagnetic particles.

7. The apparatus of claim 1 wherein thermal imaging means are provided to selectively demagnetize previously spatially periodic magnetized areas of the movable layer of electrically grounded ferromagnetic particles.

* * * * *